United States Patent
Pautis et al.

(10) Patent No.: US 10,669,970 B2
(45) Date of Patent: Jun. 2, 2020

(54) THRUST REVERSER SYSTEM HAVING LIMITED AERODYNAMIC DISTURBANCE

(71) Applicant: Airbus Operations S.A.S., Toulouse (FR)

(72) Inventors: Olivier Pautis, Merville (FR); Lionel Czapla, Cornebarrieu (FR)

(73) Assignee: Airbus Operations S.A.S. (FR)

( * ) Notice: Subject to any disclaimer, the term of this patent is extended or adjusted under 35 U.S.C. 154(b) by 178 days.

(21) Appl. No.: 16/007,006

(22) Filed: Jun. 13, 2018

(65) Prior Publication Data

US 2018/0372024 A1  Dec. 27, 2018

(30) Foreign Application Priority Data

Jun. 21, 2017 (FR) ...................................... 17 55672

(51) Int. Cl.
| | |
|---|---|
| F02K 1/70 | (2006.01) |
| F02K 1/76 | (2006.01) |
| F02K 1/72 | (2006.01) |

(52) U.S. Cl.
CPC .................. F02K 1/70 (2013.01); F02K 1/72 (2013.01); F02K 1/763 (2013.01)

(58) Field of Classification Search
CPC ... F02K 1/70; F02K 1/72; F02K 1/763; F02K 1/41; F02K 3/06; F05D 2260/50
See application file for complete search history.

(56) References Cited

U.S. PATENT DOCUMENTS

| | | | |
|---|---|---|---|
| 3,981,451 A * | 9/1976 | Prior | F02K 1/72 239/265.31 |
| 8,162,257 B2 | 4/2012 | Teulou | |
| 8,720,818 B1 | 5/2014 | Teulou et al. | |
| 10,519,899 B2 * | 12/2019 | Pautis | F02K 1/763 |
| 2013/0205753 A1 * | 8/2013 | Todorovic | F02K 3/025 60/226.2 |
| 2016/0025037 A1 * | 1/2016 | Teia Dos Santos Mendes Gomes | F02K 1/72 415/1 |
| 2017/0159606 A1 * | 6/2017 | Stuart | F02K 1/70 |
| 2018/0087474 A1 * | 3/2018 | Chuck | F02K 1/763 |
| 2019/0003420 A1 * | 1/2019 | Pautis | F02K 1/72 |
| 2020/0003154 A1 * | 1/2020 | Carr | F02K 1/763 |

FOREIGN PATENT DOCUMENTS

| | | |
|---|---|---|
| EP | 2 837 810 A1 | 2/2015 |
| FR | 2 757 570 A1 | 6/1998 |
| FR | 2 935 354 A1 | 3/2010 |
| FR | 2 935 444 A1 | 3/2010 |
| FR | 3 016 006 A1 | 7/2015 |

* cited by examiner

*Primary Examiner* — Carlos A Rivera
(74) *Attorney, Agent, or Firm* — Lerner, David, Littenberg, Krumholz & Mentlik, LLP

(57) ABSTRACT

A thrust reverser system includes two thrust reversal cascades, of which the first cascade is entrained by an actuator, and which are configured to adopt a retracted position in which they are housed in a space located outside the duct. The action of the actuator brings about: rearward displacement of the first cascade in the direction of a nacelle opening; and during part of the rearward displacement of the second cascade, simultaneous pivoting of this second cascade under the action of a control lever, the interaction of which with a fixed guide rail forces the front end of the lever to move radially inwards while the lever is entrained rearwards by the second cascade.

12 Claims, 5 Drawing Sheets

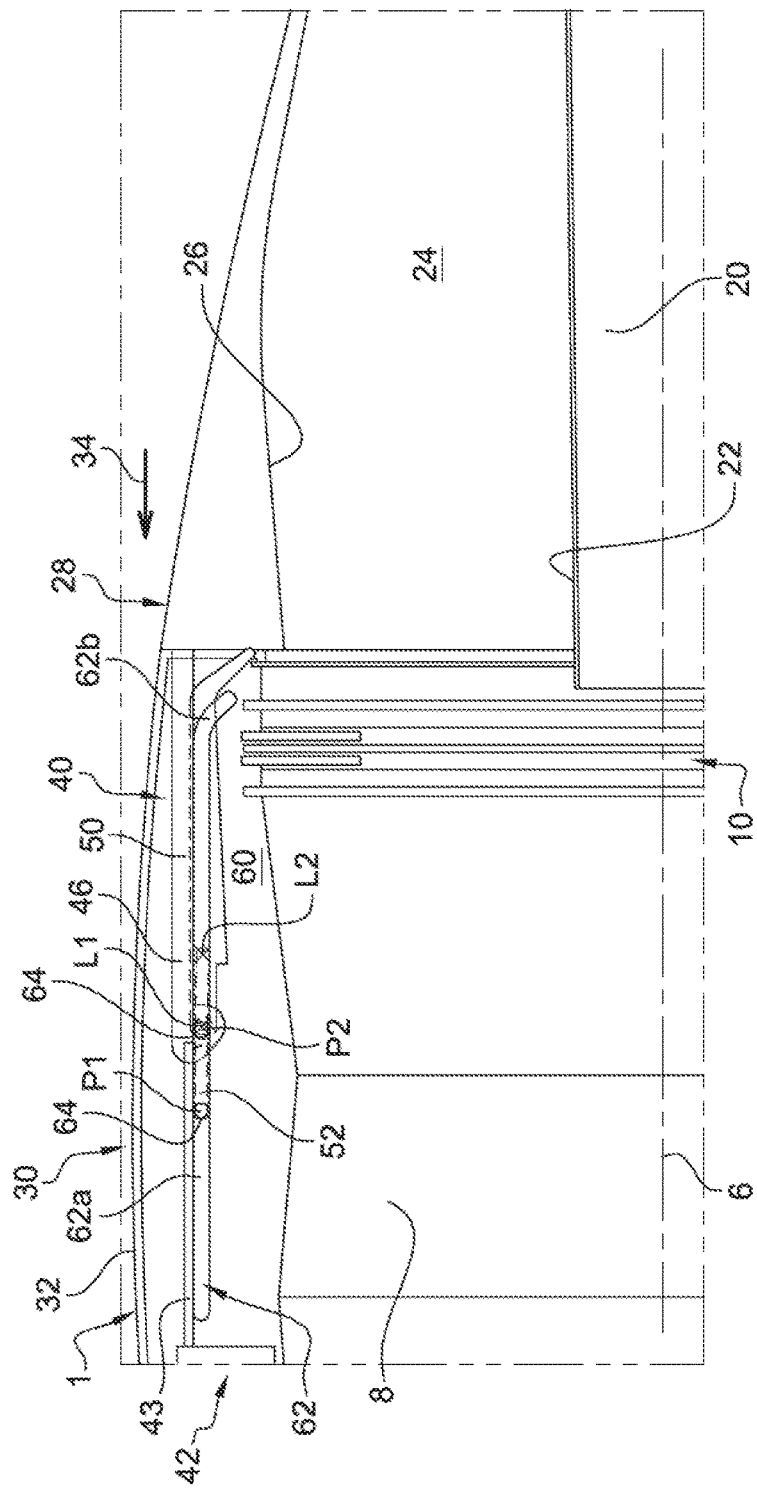

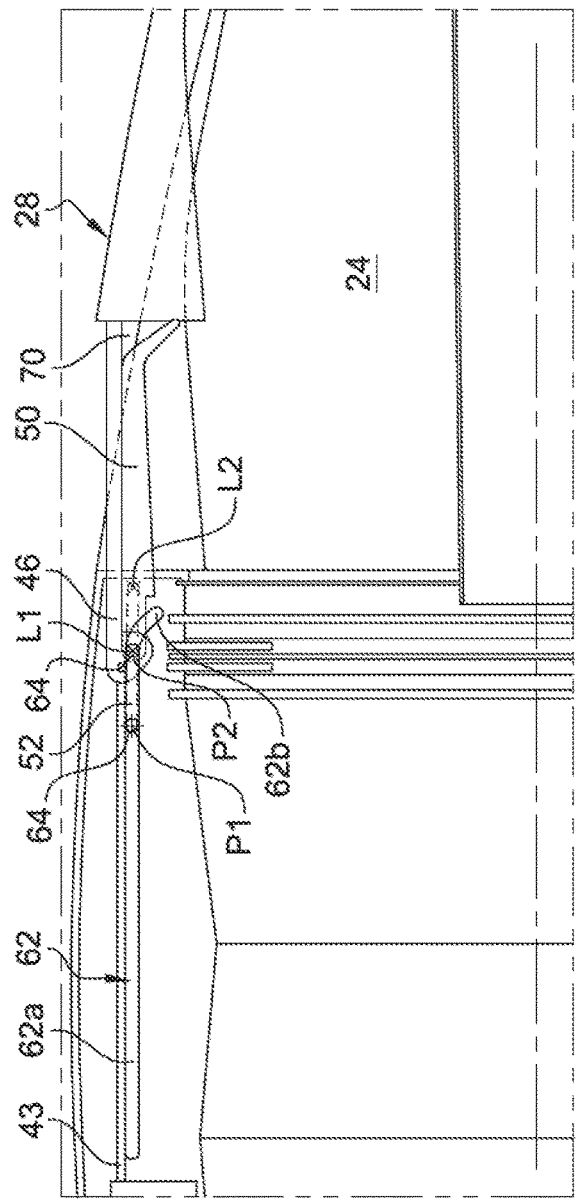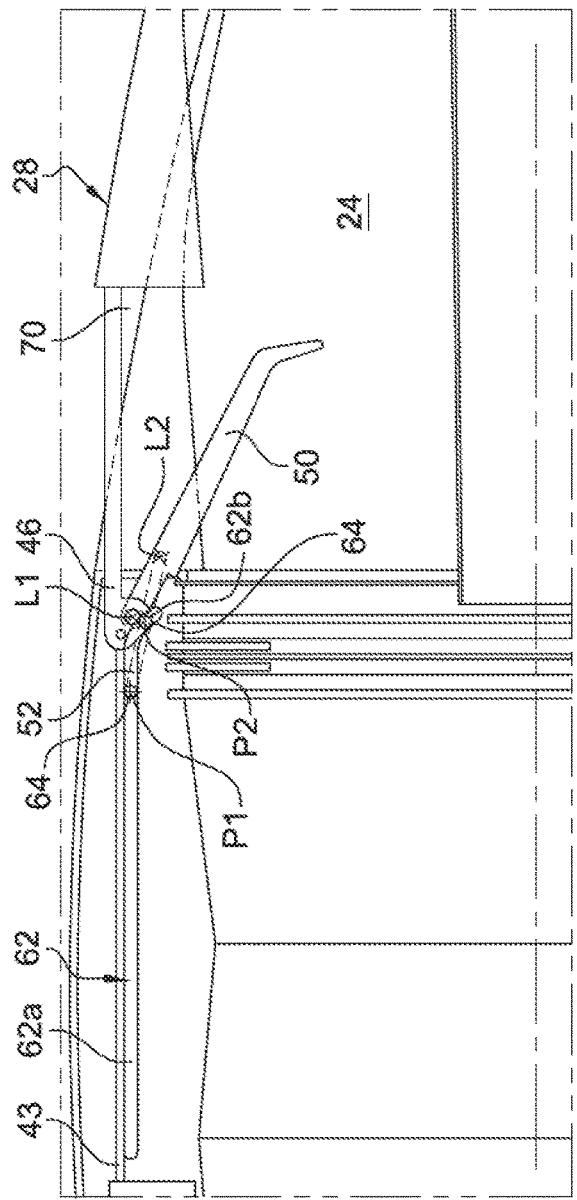

THRUST REVERSER SYSTEM HAVING LIMITED AERODYNAMIC DISTURBANCE

FIELD OF THE INVENTION

The invention relates to the field of thrust reverser systems for aircraft turbomachines.

It relates more particularly to systems comprising thrust reversal cascades equipping turbofan engines.

The invention also relates to an aircraft comprising turbomachines equipped with thrust reverser systems of this type. It preferably applies to commercial aircraft.

BACKGROUND OF THE INVENTION

Thrust reversal systems are known for example from documents FR 2 935 444 and FR 2 935 354. Amongst the various thrust reversal principles implemented in aircraft turbomachines, reversal cascade systems are known, these being provided with passages oriented so as to direct the air obtained from the secondary duct forwards in order to generate the reverse thrust force. The air is forced out of this secondary duct by reverser doors which, in the active configuration of the system, at least partially close this flow duct.

On the other hand, in the inactive configuration, each reverser door is in a stowed position in which it forms part of the outer wall of the secondary duct, also known as the OFS (Outer Fixed Structure). More specifically, in this inactive configuration of the reverser system, each door constitutes part of this outer wall of the secondary duct, within a mobile outer nacelle cowling containing the reversal cascade. During the transition from the inactive configuration to the active configuration, the mobile outer cowling is displaced rearwards by actuators, so as to clear the cascade, and bring the reverser doors into their position of closing of the secondary duct, by means of appropriate mechanical kinematics.

Although this principle is extensively applied, it nevertheless suffers from a problem of aerodynamic disturbance of the flow of air which passes through the secondary duct in the inactive configuration of the system. In fact, in this configuration, the flow of air within the secondary duct is disturbed during its passage over the areas where the body of the mobile outer cowling and the reverser doors, which are added onto this body, meet. This disturbance produces drag as well as pressure losses within the secondary duct, which lead to a decrease in the overall performance of the turbomachine.

BRIEF SUMMARY OF THE INVENTION

Optimization of the design of these thrust reverser systems, in order to reduce the disturbance to the airflow in the secondary duct when the thrust reverser system is in the inactive configuration may be desirable.

An embodiment of the invention is a thrust reverser system for an aircraft turbofan engine, the reverser system comprising at least one first thrust reversal cascade of which a rear end is secured to a mobile outer nacelle cowling and through which the air of a secondary duct of the turbomachine is designed to flow in the active configuration of the reverser system, the system also comprising at least one actuation actuator.

According to an embodiment of the invention, the system comprises at least one second thrust reversal cascade through which the air of the secondary duct is designed to flow in the active configuration of the reverser system, a front end of the second cascade being connected, via a first articulated connection, to a front end of the first cascade, said first and second cascades being configured to adopt on one hand, in an inactive configuration of the reverser system, a retracted position in which they are housed in a housing space located outside said secondary duct and on the other hand, in the active configuration of the reverser system, a deployed position in which the second cascade is positioned in said secondary duct so as to redirect the air in the direction of the first cascade.

In addition, the system also comprises at least one control lever of which a rear end is connected to the second cascade by a second articulated connection forward of which the control lever is also connected to a fixed guide rail by a first connection point and a second connection point located aft of the first point.

Finally, the system is configured such that, during passage from the inactive configuration to the active configuration, the action of said actuator brings about:

rearward displacement of the first cascade in the direction of a nacelle opening, cleared by the mobile outer nacelle cowling that is entrained rearwards together with the first cascade; and during at least part of the rearward displacement of the second cascade, simultaneous pivoting of this second cascade about the first articulated connection under the action of the control lever, the interaction of which with the guide rail forces the front end of the lever to move radially inwards while the lever is entrained rearwards by the second cascade.

Thus, an embodiment of the invention contrasts with the conventional embodiments of cascade-type reverser systems in that the reverser door is replaced with a second thrust reversal cascade positioned outside the secondary duct in the inactive configuration of the system. On transition to the active configuration, this second cascade is designed to move rearwards with the first cascade, while intruding into the secondary duct. By virtue of this design, which is specific to the present invention, when the system is in the inactive configuration the thrust reversal cascades do not disturb the flow of air passing through the secondary duct of the turbomachine. Advantageously, this makes it possible to improve the overall performance of the turbomachine.

Aspects of the invention preferably provides at least one of the following optional features, taken in isolation or in combination.

In the inactive configuration, the control lever is also housed in the housing space, and, in the active configuration, the control lever is located in part in said nacelle opening without protruding into said secondary duct.

The guide rail has an essentially straight front portion and a rear portion that extends radially inward in the rearward direction.

The guide rail is secured to a fan casing of the turbomachine.

The actuator comprises an actuator rod which is articulated on a front end of the first cascade or on a front end of the second cascade. In the first case, the first cascade entrains the second cascade, while the situation is reversed in the second case.

The first and second connection points are created using rollers that cooperate with the guide rail.

Said housing space is an inner space of the nacelle.

In the inactive configuration, the first and second cascades are essentially parallel, and are each situated at least partly radially opposite a fan casing of the turbomachine.

The system comprises a plurality of first cascades which are adjacent in the tangential direction of the turbomachine, preferably such as to form an assembly of cascades extending over an angular sector of 300 to 360° around a longitudinal axis of the turbomachine, and each first cascade is associated with a second cascade.

The first cascades are connected to one another mechanically, such that the number of actuators is preferably smaller than the number of first cascades. However, these two numbers could be identical, without departing from the scope of the invention.

The invention also relates to an aircraft turbofan engine comprising a thrust reverser system such as that described above, and to an aircraft comprising at least one such turbomachine.

Other advantages and characteristics of the invention will become apparent from the following non-limiting detailed description.

BRIEF DESCRIPTION OF THE DRAWINGS

This description will be provided with reference to the appended drawings, in which:

FIG. 1 represents a plan side view of an aircraft comprising a turbomachine equipped with a thrust reverser system according to the invention;

FIG. 2 represents a partial view in longitudinal section of the turbomachine shown in the preceding figure, with its thrust reverser system in the inactive configuration;

FIGS. 5a and 5b represent views similar to that in FIG. 2, in various states during transition from an inactive configuration to an active configuration of the thrust reverser system.

DETAILED DESCRIPTION

Figure 3:
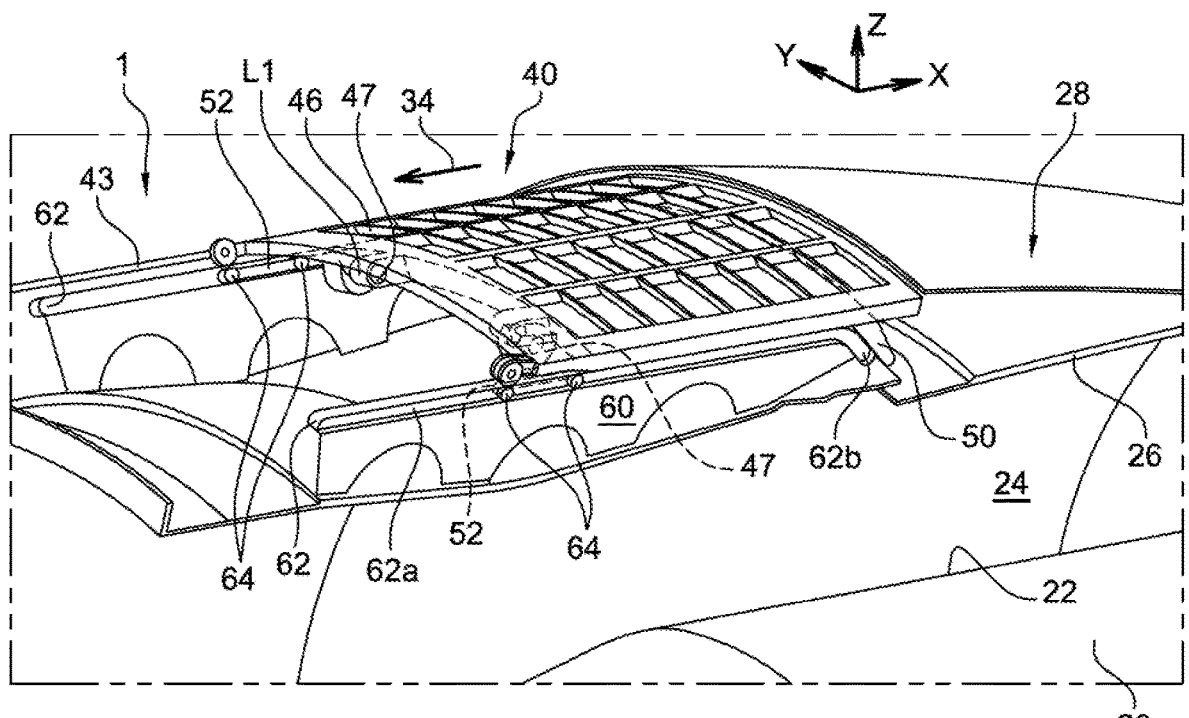
FIG. 3 represents a partial view in perspective of the turbomachine shown in the preceding figure.

FIG. 1 represents an aircraft 100 of the commercial aircraft type, comprising two wings 2 (only one of which is shown in FIG. 1) secured on a fuselage 3, and each supporting a turbomachine 1 of the turbofan type, such as a jet engine.

A preferred embodiment of the turbomachine 1 will now be described with reference to FIGS. 2 to 4. Throughout the following description, by convention, the X direction corresponds to the longitudinal direction of the turbomachine, this direction being parallel to the longitudinal axis 6 of this turbomachine. Also, the Y direction corresponds to the direction oriented transversely relative to the turbomachine, and the Z direction corresponds to the vertical direction or the height, these three directions X, Y, Z being orthogonal to one another.

In a conventional manner, the turbomachine 1 comprises a fan casing 8 which is centred on the axis 6 and is extended by an intermediate casing 10, formed by a hub 12 and an outer ferrule 14 connected to this hub by means of arms (not shown) which extend essentially radially, and at least some of which constitute outlet guide vanes also known as OGVs. Preferably, at least some of these arms are structural, as well as being profiled aerodynamically. The hub 12 is extended rearwards by a central casing also known as the core casing, which has the reference 18 in FIG. 4, and encloses the core of the turbomachine. An inter-duct compartment 20 is provided around the central casing, which compartment is delimited by a fixed inner cowling 22 also known as the IFS. More specifically, this is an inner wall 22 which delimits an annular secondary flow duct 24 of the turbomachine. This flow duct 24 is delimited at the front by the fan casing 8 as well as by the intermediate casing, and is then extended rearwards, thus being delimited internally by the cowling 22, and externally by an outer wall of the secondary duct 24 also known as the OFS. The latter is integrated in a mobile outer nacelle cowling 28. In fact, the turbomachine 1 also comprises a nacelle 30, a front part of which is formed by hollow cowls 32 which surround the fan casing 8 and the outer ferrule 14 of the intermediate casing. These cowls 32 are generally known as fan cowls. They are fitted in an articulated manner so as to allow access for operators for the purpose of carrying out maintenance operations. The cowls 32 are extended rearwards by the aforementioned outer mobile cowling 28, the latter being able in fact to be translated rearwards relative to the nacelle cowls 32, along the longitudinal axis 6. In this respect, it should be noted that, throughout the description, the terms "front" and "rear" are considered in relation to the direction of advance of the aircraft consequent to the thrust of its turbomachines, this direction of advance being represented by the arrow 34.

Figure 4:
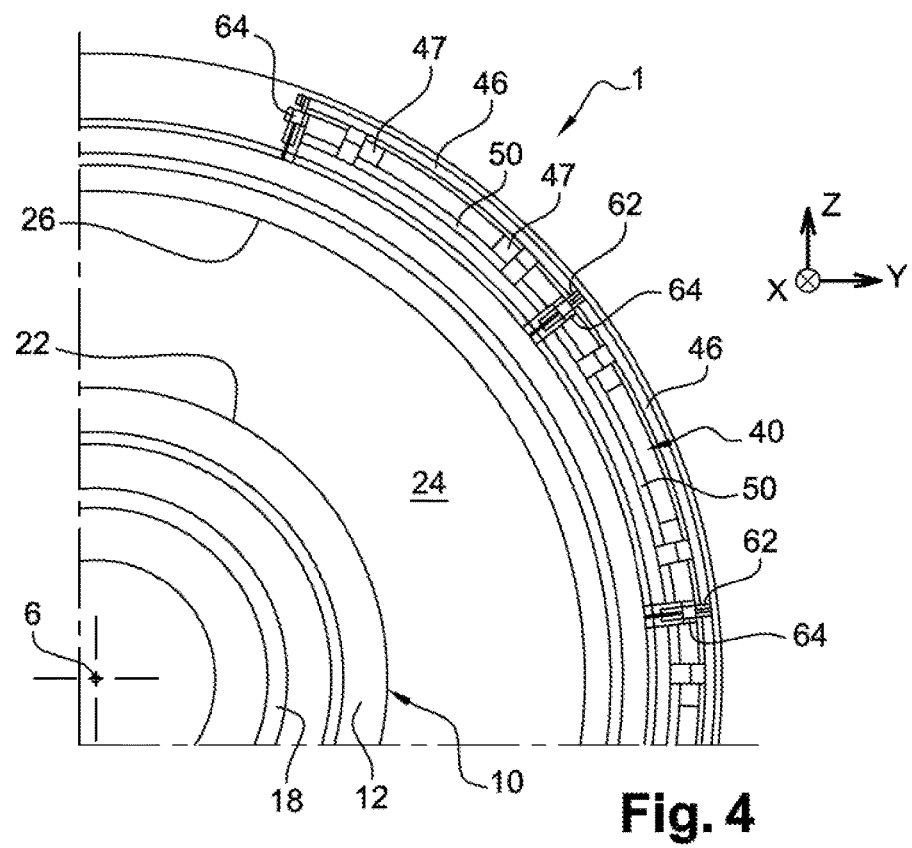
FIG. 4 represents a view in cross section of the turbomachine shown in FIGS. 2 and 3.

In this environment, a thrust reverser system 40 specific to the present invention is integrated, an embodiment of which will now be described in its inactive configuration, as represented in FIGS. 2 to 4.

Firstly, it is noted that the reverser system 40 is formed from a plurality of modules which are repeated, and are arranged adjacent to one another in the tangential direction of the turbomachine, all around the axis 6. As will be described hereinafter, each module comprises in particular a first thrust reversal cascade 46 and a second thrust reversal cascade 50. At least some of these modules each comprise in the front part an actuator 42, the body of which is for example fitted fixed on the fan casing 8. The actuator 42 comprises an actuator rod 43 which is fitted articulated on a front end of the first thrust reversal cascade 46.

In the inactive configuration, the first cascade 46 is located radially towards the exterior, opposite the fan casing 8 and the outer ferrule 14 of the intermediate casing. The first cascade 46 is situated at the front relative to the outer mobile cowling 28, and the rear end of this cascade 46 is integral with the front end of the cowling 28. Consequently, during the movements observed in the course of actuation of the thrust reverser system 40, the first cascade 46 and the cowling 28 form a single, integral assembly, which is subjected to the same axial displacements.

In the inactive configuration, the cascade 46 and the actuator rod 43 are consequently located in an advanced position of the nacelle, at the fan cowls, which habitually have a larger diameter than that of the tapered rear part of the nacelle, thus making it possible to benefit from more space for their integration. This advantageously results in a nacelle 30 with a reduced outer diameter. In this respect, it should be noted that only the actuators 42 can put into motion all the parts of the module, such that no additional actuator is provided in the cowling 28. The latter can thus have reduced dimensions, having a positive impact on the dimensions of the remainder of the nacelle.

The reversal cascade 46 can have a conventional flat form, or it can be slightly rounded in the circumferential direction. In a conventional manner, it comprises orifices through which the air of the secondary duct 24 is designed to circulate, when the reverser system 40 is in the active configuration. It can reorient forwards a flow of air which passes through it, thanks to fins or similar elements provided between the orifices.

Beneath the first cascade 46, the reverser system 40 comprises the second thrust reversal cascade 50, which is preferably essentially planar and made in one piece. This cascade can nonetheless have a front end that is slightly inclined so as to extend radially inward in the rearward direction, as shown in FIGS. 2 and 3. The front end of the second cascade 50 is connected to the front end of the first cascade 46 by means of a first articulated connection L1 that comprises, for example, two hinges 47.

In the inactive configuration, the second cascade 50 is essentially parallel to the first cascade 46, and it is also located at least partly radially opposite the fan casing 8. The two cascades 46, 50 are in a retracted position with respect to one another.

The second cascade 50 is also of conventional design, and is capable, in an active configuration, of extending into the secondary duct 24 in the manner of a door. However, the objective is not to block the secondary duct 24 but to redirect the air passing through that duct towards the first cascade, as will be described below.

In addition to the cascades 46, 50, the reverser system 40 comprises at least one control lever 52 and a guide rail 62 for this lever, these parts making it possible to obtain the kinematics and the synchronization desired for the two cascades. Preferably, this is a lever and an associated rail that are provided at each one of the two circumferential ends of the set of two cascades 46, 50. In the following, only cooperation between one of the levers 52 and its rail 62 will be described.

The control lever 52 comprises a rear end that is connected to the second cascade 50, between a front end and the rear end of the latter. This mechanical connection is established by means of a second articulated connection L2.

The two connections L1 and L2 define pivoting axes which are all essentially parallel to one another within a single reverser module. These pivoting axes are preferably orthogonal to the longitudinal axis 6, and are oriented tangentially.

Forward of the second connection L2, the control lever 52 is also connected to the fixed guide rail 62 by a first connection point P1 and a second connection point P2, which are each in the form of a roller 64 that cooperates with the rail. The second point P2 is located aft of the first point P1, and these points are preferably aligned with the second connection L2 as seen from the articulation axis defined by the latter, as in FIG. 2.

The rail 62 is fixed to the fan casing 8. It has an essentially straight front portion 62a that is essentially parallel to the axis 6 of the turbomachine. An adjacent, shorter, rear portion has, for its part, a shape that extends radially inward in the rearward direction. It can be straight or curved.

In the inactive configuration of the reverser system 40, the control lever 52 and the two cascades 46, 50 are arranged entirely in a housing space 60, defined by the nacelle outside the secondary duct 24, in the thickness of the nacelle. The secondary duct 24 is thus not disturbed by the presence of these elements, and the outer wall 26 which delimits the secondary duct 24 can therefore be continuous, for example by being formed in a single piece. This makes it possible to substantially improve the overall aerodynamic performance of the turbomachine.

The housing space 60 is partly defined by the hollow of the fan cowls 32, as well as by the hollow of an outer mobile cowling 28 that opens in the forward direction and is defined in part by the internal wall 26 of the secondary duct 24. This hollow of the housing 28 is situated in the rear axial continuity of the hollow of the fan cowls 32. In the inactive configuration, this space 60 also houses the actuator 42.

In this respect, it is specified that the modules of the reverser system can be connected to one another at the rails 62 and the rollers 64, each of these in fact being able to form part of mechanical connection means provided between the first cascades 46 which are directly consecutive in the tangential direction. There is also a sufficient number of these first cascades provided for them to form an assembly extending over an angular sector of 300 to 360° around the longitudinal axis 6 of the turbomachine. By way of indicative example, the number of first cascades 46 can for example be between 4 and 12. The same applies to the second cascades 50, which are designed to form, in the active configuration of the reverser system, a crown extending over the same angular sector in the secondary duct 24.

In this particular case, since the first cascades 46 are secured to one another, it is not necessary to provide an actuator 42 for each module, such that the number of these actuators 42 can be smaller than the number of cascades. For example, one actuator 42 is provided every two cascades 46 in the tangential direction. Alternatively, it is possible to provide one actuator 42 every three cascades 46.

The fixed guide rails 62, for their part, are arranged between the modules, which therefore each comprise a first cascade 46, a second cascade 50 and two control levers 52.

One of the specific features of the invention consists in the fact that the actuation of the actuators 42 sets into motion all of the parts of the thrust reverser system, without it being necessary to provide additional actuation means. This particular so-called "in-line" arrangement makes it possible to benefit from simplicity of design, which also limits the mass of the thrust reverser system, and therefore increases the overall performance of the turbomachine.

In operation, when each actuator 42 is actuated so as to go from the inactive configuration to the active configuration, the actuator rod 43 is extended rearwards, as represented in FIG. 5a, showing an intermediate configuration between the inactive configuration and the active configuration.

The actuator rod 43 directly displaces the first cascade 46 rearwards. This displacement is a translation in the X direction, which causes the first cascade 46 to penetrate into a nacelle opening 70 which is progressively cleared by the outer mobile cowling 28. The latter is subjected to the same movement as the first cascade 46.

During this first phase of extension of the rod 43, the second cascade 50 is also displaced rearwards, being entrained by the first cascade 46 via the first connection L1. This is the same for the control lever 52, the inclination of which does not vary over the course of its rearward displacement. Indeed, during the axial movement of this lever 52, the two rollers 64 move only in the straight front portion 62a of the rail, and thus do not bring about any inclination of the lever.

During this first phase of extension of the actuator rod 43, the two cascades 46, 50 are consequently displaced rearward into their retracted position, with the control lever 52 as a follower element.

Further extension of the actuator rod 43 initiates a second phase of movement when the roller 64 forming the second point P2 enters the rear portion 62b of the rail. Indeed, while the second cascade 50 continues to be entrained rearward by the first cascade 46 under the action of the actuator, the radial offset between points P1 and P2 forces the lever to change orientation, as shown schematically in FIG. 5b, which shows a subsequent intermediate configuration. The front end of the lever 52 is forced radially inward while it continues to be entrained rearward, and as a result the second articulation connection L2 also moves radially inward into the secondary duct 24. This causes the second cascade 50 to pivot about the first connection L1, owing to it being entrained inward by the second connection L2.

Figure 6:
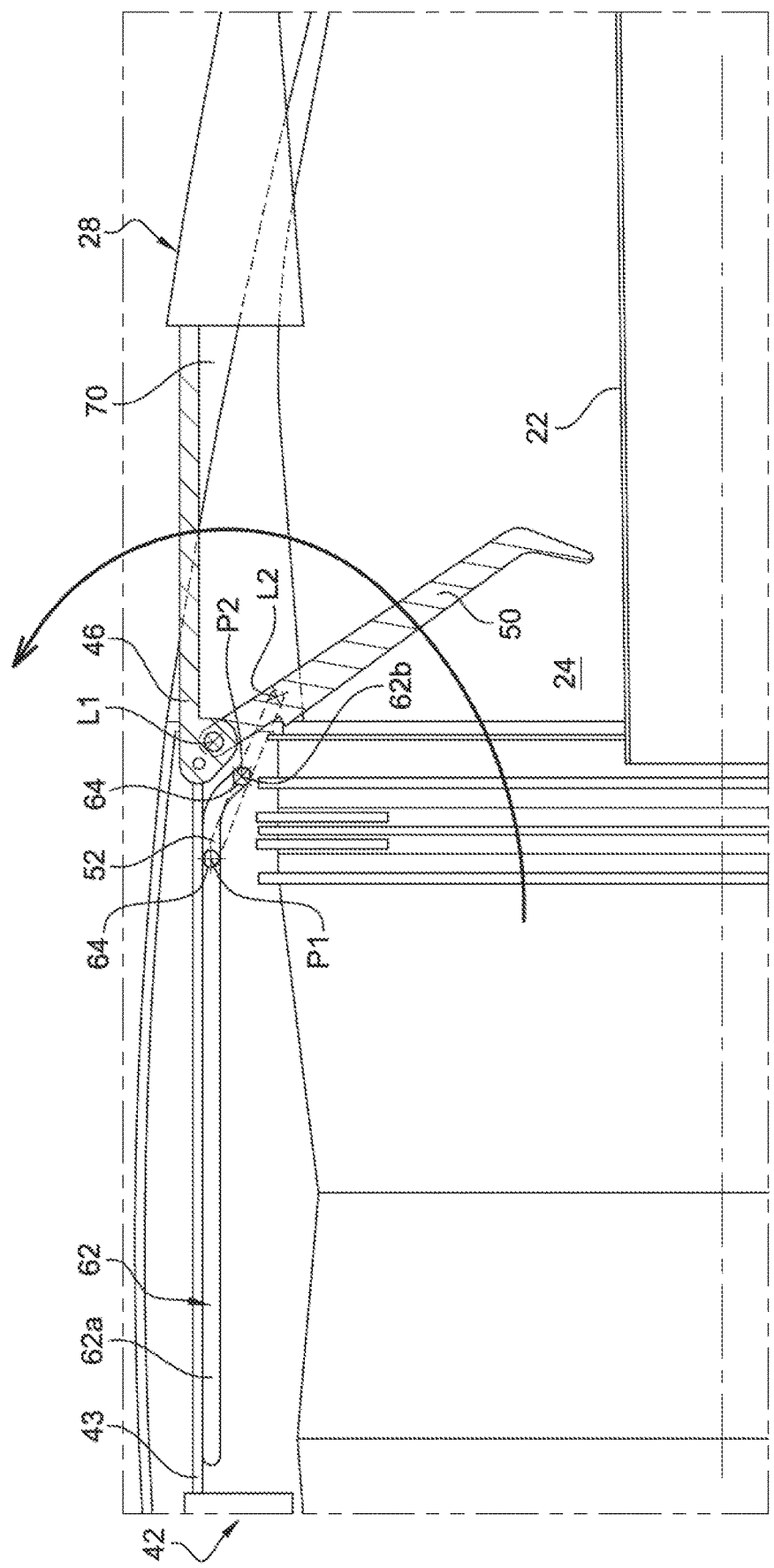
FIGS. 6 to 8 represent views similar to those of FIGS. 2 to 4, with the thrust reverser system in the active configuration.
Figure 7:
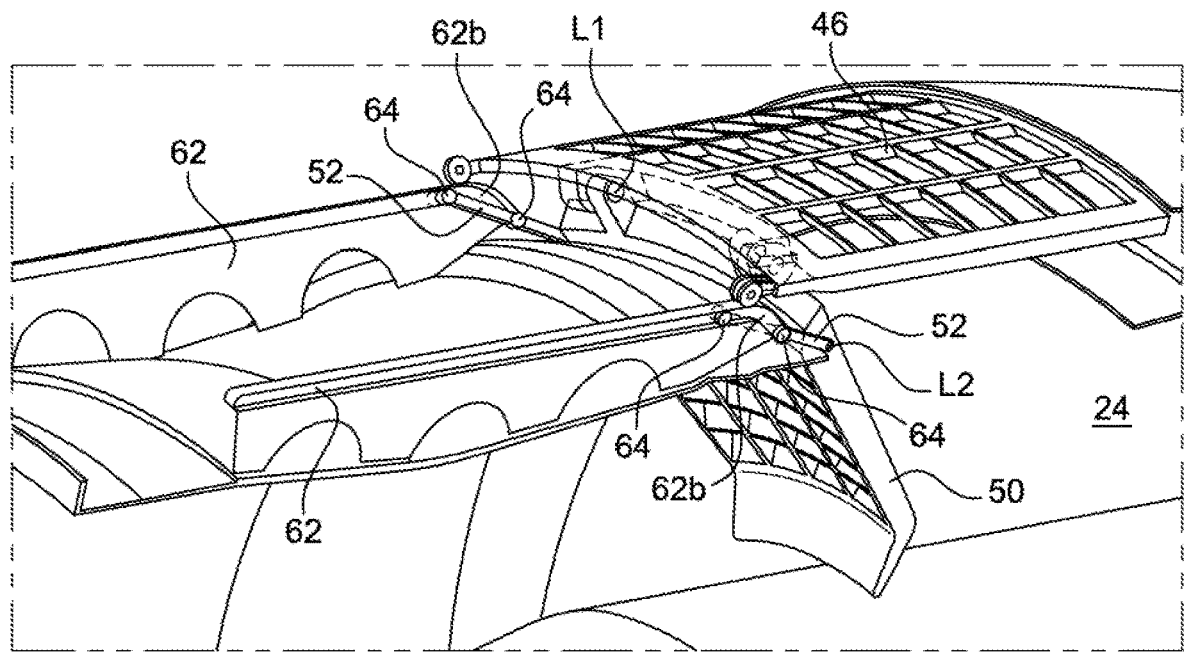
Figure 8:
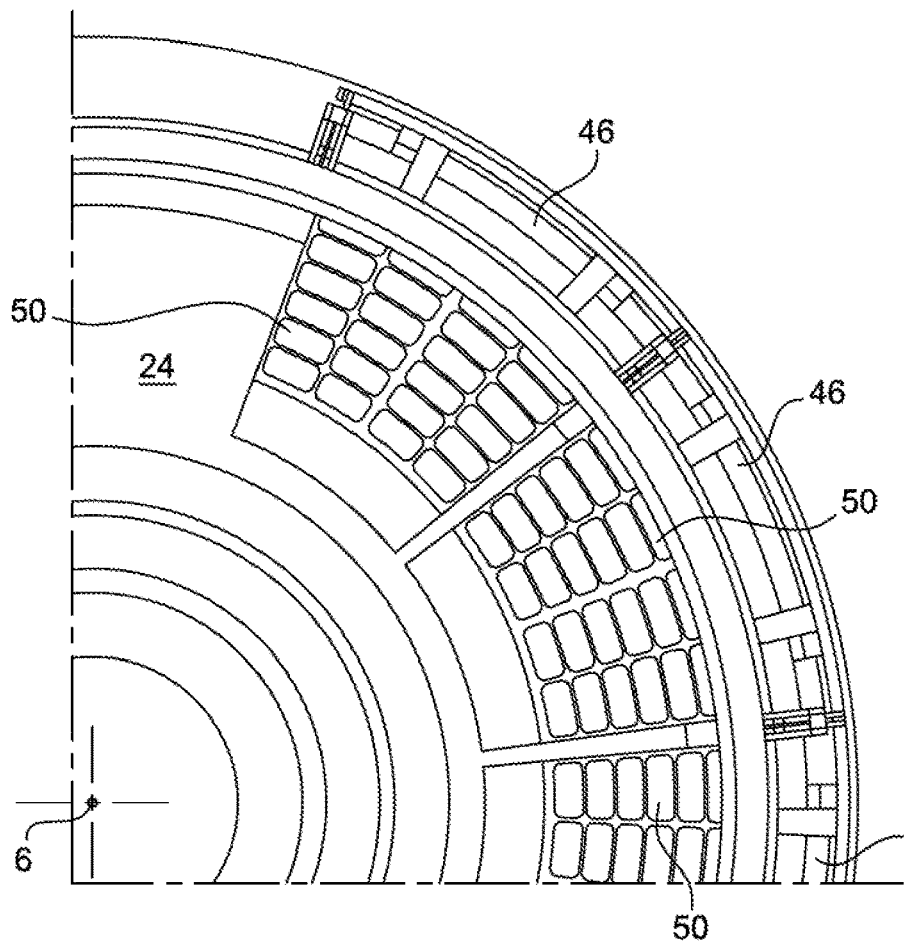

The judiciously positioned elements of the system 40 thus permit perfect synchronization of the movements, such that the second cascade 50 can exit from the space 60 in which it is arranged axially, whilst moving progressively towards the inside of the secondary duct 24, until it reaches a deployed position of the two cascades 46, 50, as shown in FIGS. 6 to 8.

During these movements between the inactive configuration and the active configuration, the inclination of the first cascade 46 does not change. Once the active configuration has been reached, the lever 52 remains partially housed in the space 60, only part thereof being located in the opening 70, but without entering the secondary duct 24. This limits aerodynamic disturbances also during the thrust reversal phase.

In the active configuration, the two cascades 46, 50 can form an angle of between 40 and 90°. In addition, the rear end of the second cascade 50 (corresponding to its radially inner end in the active configuration) is positioned close to the IFS cowling 22. Thus the air flowing upstream in the secondary duct 24 is forced to pass through the second cascade 50, which redirects this air towards the first cascade 46, which in turn then redirects the air forwards and out of the nacelle so as to obtain the desired reverse thrust force.

It will be appreciated that various modifications can be made by persons skilled in the art to the invention which has just been described, purely by way of non-limiting examples.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A thrust reverser system for an aircraft turbofan engine, the thrust reverser system comprising:
    at least one first thrust reversal cascade with a rear end secured to a mobile outer nacelle cowling, wherein air of a secondary duct of the aircraft turbofan engine is configured to flow through the mobile outer nacelle cowling in an active configuration of the thrust reverser system;
    at least one actuator;
    at least one second thrust reversal cascade, a front end of the at least one cascade connected, via a first articulated connection, to a front end of the at least one first cascade, said first and second thrust reversal cascades configured to adopt, in an inactive configuration of the thrust reverser system, a retracted position in which the first and second thrust reversal cascades are housed in a housing space located outside said secondary duct and, in the active configuration of the thrust reverser system, a deployed position in which the second thrust reversal cascade is positioned in said secondary duct so as to redirect air of the secondary duct in the direction of the at least one first thrust reversal cascade; and
    at least one control lever connected to the second thrust reversal cascade by a second articulated connection and to a fixed guide rail by a first connection point and a second connection point located aft of the first connection point, wherein the thrust reverser system is configured such that, the actuator is configured for:
    a rearward displacement of the at least one first thrust reversal cascade in a direction of a nacelle opening, cleared by the mobile outer nacelle cowling entrained rearwards together with the at least one first thrust reversal cascade; and
    during at least part of the rearward displacement of the second thrust reversal cascade, simultaneous pivoting the second thrust reversal cascade about the first articulated connection and forcing the control lever to move radially inwards through the guide rail.

2. The thrust reverser system according to claim 1, wherein, in the inactive configuration, the control lever is also housed in the housing space, and
    wherein, in the active configuration, the control lever is located in part in said nacelle opening without protruding into said secondary duct.

3. The thrust reverser system according to claim 1, wherein the guide rail has an essentially straight front portion and a rear portion that extends radially inward in a rearward direction.

4. The thrust reverser system according to claim 1, wherein the guide rail is secured to a fan casing of the aircraft turbofan engine.

5. The thrust reverser system according to claim 1, wherein the actuator comprises an actuator rod articulated on the at least one first thrust reversal cascade or on the at least one second thrust reversal cascade.

6. The thrust reverser system according to claim 1, wherein the first and second connection points comprise rollers that cooperate with the guide rail.

7. The thrust reverser system according to claim 1, wherein said housing space is an inner space of the nacelle.

8. The thrust reverser system according to claim 1, wherein, in the inactive configuration, the first and second thrust reversal cascades are essentially parallel, and are each situated at least partly radially opposite a fan casing of the aircraft turbofan engine.

9. The thrust reverser system according to claim 1, wherein the at least one first thrust reversal cascade comprises a plurality of first thrust reversal cascades which are adjacent in the tangential direction of the aircraft turbofan engine, such as to form an assembly of cascades extending over an angular sector of 300 to 360° around a longitudinal axis of the aircraft turbofan engine, wherein each first thrust reversal cascade is associated with a second thrust reversal cascade.

10. The thrust reverser system according to claim 9, wherein the first thrust reversal cascades are connected to one another mechanically, such that the number of actuators is smaller than the number of first thrust reversal cascades.

11. An aircraft turbofan engine comprising a thrust reverser system according to claim 1.

12. An aircraft comprising at least one aircraft turbofan engine according to claim 11.

\* \* \* \* \*